June 20, 1961  R. D. BUGEL  2,989,432

METHOD OF MAKING CLOSURE DISCS

Filed March 16, 1956

INVENTOR.
ROELOF DIRK BUGEL
BY
AGENT

United States Patent Office 2,989,432
Patented June 20, 1961

2,989,432
METHOD OF MAKING CLOSURE DISCS
Roelof Dirk Bugel, Eindhoven, Netherlands, assignor, by mesne assignments, to North American Philips Company, Inc., New York, N.Y., a corporation of Delaware
Filed Mar. 16, 1956, Ser. No. 571,920
Claims priority, application Netherlands Apr. 14, 1955
2 Claims. (Cl. 154—81)

This invention relates to a method of manufacturing closure or sealing discs.

It is well-known to seal a cylindrical metal housing of an electric part, more particularly of an electrolytic capacitor, by means of a disc which fits within the housing and is supported from a supporting rim thereof, the housing rim being crimped over the disc. In order to ensure a moisture-tight seal, the disc is usually made of a layer of resilient material, such as rubber, and a layer of rigid insulating material, such as hard paper.

In a cheap method of producing such a composite sealing disc, the disc is stamped by means of two puunches, which move towards each other, from a sheet comprising two layers which are guled together. By pressing both punches toward the sheet a sharp protruding cutting rim of one of said punches, which rim corresponds to the circumference of the required sealing disc and surrounds an ejection aperture, is pressed into the resilient layer so that the latter is cut through. Then an inner part of the opposite punch presses the rigid layer onto the cutting rim, so that from said layer a disc is cut equal in size to the part cut from the rubber layer.

A sealing disc stamped in the above-described manner does not always produce a desired liquid-tight seal. It is particularly difficult to ensure the desired completely tight seal, when on the outside of the sealing disc an annular member is arranged which is provided with twist lugs and is held by the crimped rim of the housing. This difficulty is probably due to the fact that the resilient material of the sealing disc does not sufficiently engage the housing wall laterally.

It is an object of the invention to provide a composite sealing disc by which the above difficulty is reduced and also to provide a method of manufacturing such a sealing disc.

According to the invention, a sealing disc for sealing the housing of an electric part, more particularly an electrolytic capacitor, comprises a rigid insulating layer and a resilient layer and is stamped from a sheet consisting of two layers which are glued together. The resilient layer projects beyond all portions of the periphery of the rigid layer a distance which at a maximum is equal to the thickness of the resilient layer. This ensures a better lateral pressure of the resilient material against the wall of the housing required to be sealed by means of the disc than is obtained with the above-described known sealing disc.

According to the invention, such a disc is manufactured in a simple manner by using a punch which is not provided with a cutting ring which slopes outwards, but with a flat rim which extends at right angles to the direction of stamping or is slightly inclined inwards and closely surrounds the ejection aperture. With a suitable width of this rim, the material of the resilient layer is squeezed into the ejection aperture so as to form a circular projection when the punches are pressed to the sheet.

In order that the invention may be readily carried into effect, it will now be described more fully with reference to the accompanying drawing, in which.

Figure 1:
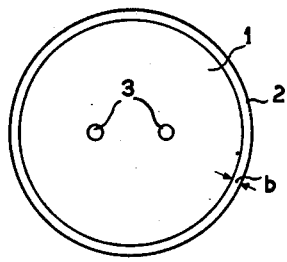
FIG. 1 is a plan view of an embodiment of the sealing disc of the present invention.
Figure 2:
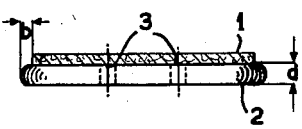
FIG. 2 is a side view of an embodiment of the sealing disc of the present invention.

The circular sealing disc shown in FIGS. 1 and 2 comprises a layer 1 of hard paper and a resilient layer 2 of rubber. The two layers are glued together throughout the entire surface of contact. For the sake of clarity, the thickness of the two layers is shown on a scale which is larger than that of the diameter of the disc. A normal thickness of the rigid layer 1 is 1 mm. and of the rubber layer 2 is 2 mms. The diameter of the rubber layer 2 exceeds that of the hard paper layer 1 so that the rubber projects beyond the paper throughout its circumference. According to the invention the distance $b$ that the resilient disc 2 projects beyond the stiff disc 1 is equal to or less than the thickness $d$ (FIG. 2) of the rubber layer 2.

The difference in diameters of layers 1 and 2 is about equal to the thickness of the rubber layer 2. Two holes 3 are punched in the disc and serve for leading in the current supply members, as will be described in detail with reference to FIG. 4.

Figure 3:
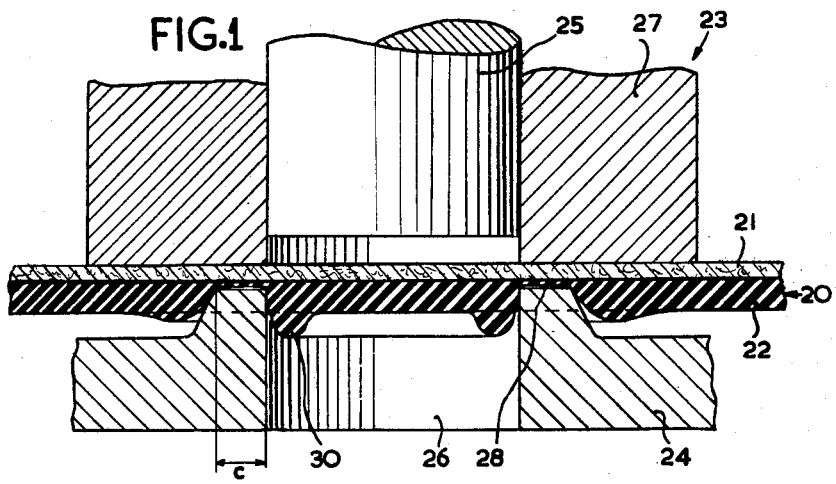
FIG. 3 is a sectional side view of a tool for carrying out the method of the invention.

In FIG. 3, a sheet 20 comprising a hard paper layer 21 and a rubber layer 22 which are glued together is inserted between two punches 23 and 24 capable of moving towards each other.

The upper punch 23 comprises a circular cylindrical inner part 25 which is guided in a hollow cylindrical outer part 27.

The lower punch 24 is provided with a cylindrical ejection aperture 26 which corresponds to the inner part 25 of the upper punch and is closely surrounded by a flat rim 28. The plane of the rim 28 is at right angles to the axis of the aperture 26 and, together with the inner wall thereof, constitutes one of the cutting edges of the tool. Thus, said cutting edge is not constituted, as is usual, by planes enclosing an acute angle but, in accordance with the invention, by planes enclosing a right angle or substantially a right angle.

The sheet 20 is arranged between the punches 23 and 24 so that the rubber layer 22 faces the edge 28 and after the sheet 20 has been so arranged, the punches are pressed onto it so that the edge 28 squeezes the rubber layer 22 into the aperture 26 with the result that an annular projection 30 is produced. Then a disc is punched from the sheet 20 by the inner part 25 of the upper punch moving downwards. In the stamped disc the rubber of the projection 30 again assumes its initial shape so that the rubber layer cut out projects beyond the edge of the disc cut from the hard paper layer 21 throughout the circumference. Subsequently, holes which are analogous to the apertures 3 (FIG. 1 and 2) can be punched in the disc in known manner.

Preferably the width $c$ (FIG. 3) of the rim 28 is not less than one half of the thickness of the rubber layer 22. If width $c$ is made too small or too large it will produce only a slight projection of the rubber in the aperture 26. The width $c$ should not exceed three times the thickness of the rubber layer 22. An advantageous rim width is from 1 to 5 mms. It will be obvious that it is not necessary for the plane of the rim 28 to be at right angles to the axis of the aperture 26. The desired projection of the resilient layer is also obtained, when said plane shapes slightly upwards or downwards towards the aperture 26 and consequently it is at an angle slightly different from a right angle to the wall of said aperture.

Figure 4:
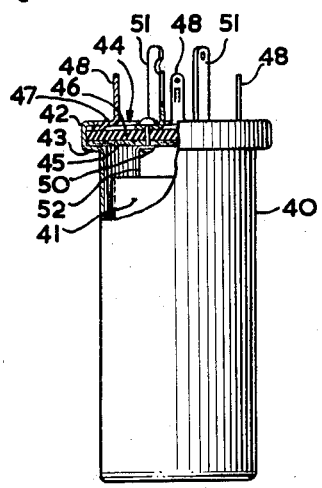
FIG. 4 is a side view partly in section of an electrolytic capacitor containing a closure member produced by the method of the invention.

FIG. 4 shows an electrolytic capacitor comprising a metal housing 40 which has one end closed by a sealing disc in accordance with the invention and which contains a wound capacitor 41.

The housing 40 is provided with a supporting rim 43 adjacent the upper rim 42. The supporting rim 43 supports a sealing disc 44 of the above-described kind, the hard paper layer 45 facing said supporting rim. A metal annular member 47 is arranged on the rubber layer 46. The member 47 is provided with twist lugs 48. The rim 42 of the housing 40 is crimped inward and presses the member 47 on the rubber layer 46.

Since, in accordance with the invention, the rubber layer 46 projects beyond all points of the periphery of the hard paper disc 45, the rubber is pressed laterally to the inner wall of the housing so that a completely moisture-tight rim seal of the housing is produced. Obviously, the position of the sealing disc 44 may be reversed so that the rubber layer 46 is arranged on the supporting rim 43 of the housing 40.

The external connections to electrodes of coil 41 are made to soldering lugs 51 which are secured to sealing disc 44 by means of aluminum rivets 50 to the lower ends of which are secured current supply leads 52 connected to the electrodes of coil 41.

What is claimed is:

1. A method of making a closure disc from a composite sheet having a layer of resilient material adhesively-united over its surface to a layer of stiff material, comprising the steps of locating the sheet with the layer of resilient material in contact with the surface of a die having a round aperture corresponding in size to the closure disc, applying pressure to an annular portion of the sheet surrounding the aperture to thereby squeeze part of the resilient material into the aperture, and forcing a punch into the aperture while applying said pressure to thereby punch out a closure member with the temporarily-displaced material thereon.

2. A method of making a closure member from a composite sheet having a layer of resilient material adhesively-united over its surface to a layer of stiff material, comprising the steps of locating the sheet with the layer of resilient material in contact with the surface of a die having an aperture corresponding in shape to the closure member applying pressure to a portion of the sheet surrounding the aperture and extending therefrom a distance of about ½ to 3 times the thickness of the layer of resilient material to thereby displace part of the resilient material into the aperture, and forcing a punch into the aperture while applying said pressure to thereby punch out a closure member with the temporarily-displaced material thereon.

References Cited in the file of this patent

UNITED STATES PATENTS

| | | |
|---|---|---|
| 544,967 | Day | Aug. 20, 1895 |
| 785,116 | Perry | Mar. 21, 1905 |
| 1,113,030 | McLaurin | Oct. 6, 1914 |
| 2,046,975 | Shaw et al. | July 7, 1936 |
| 2,126,771 | Hanson | Aug. 16, 1938 |
| 2,144,959 | Blackburn | Jan. 24, 1939 |
| 2,198,988 | Biniek | Apr. 30, 1940 |
| 2,375,518 | Bolle | May 8, 1945 |
| 2,423,965 | Coyle | July 15, 1947 |
| 2,479,959 | O'Neil | Aug. 23, 1949 |